United States Patent
Lee et al.

(10) Patent No.: US 9,243,982 B2
(45) Date of Patent: Jan. 26, 2016

(54) MEASURING APPARATUS AND MEASURING METHOD OF TRAIN WHEEL WEAR

(71) Applicant: LSIS CO., LTD., Anyang-si, Gyeonggi-do (KR)

(72) Inventors: Woo Seok Lee, Suwon-si (KR); Yong Gee Cho, Seoul (KR)

(73) Assignee: LSIS Co., Ltd., Anyang-Si, Gyeonggi-Do (KR)

( * ) Notice: Subject to any disclaimer, the term of this patent is extended or adjusted under 35 U.S.C. 154(b) by 544 days.

(21) Appl. No.: 13/711,495

(22) Filed: Dec. 11, 2012

(65) Prior Publication Data

US 2013/0158894 A1    Jun. 20, 2013

(30) Foreign Application Priority Data

Dec. 19, 2011 (KR) ................. 10-2011-0137299

(51) Int. Cl.
| | | |
|---|---|---|
| G01B 3/12 | (2006.01) |
| G01B 3/14 | (2006.01) |
| G01B 5/08 | (2006.01) |
| G01B 5/12 | (2006.01) |
| G01M 17/08 | (2006.01) |
| G01M 17/10 | (2006.01) |

(52) U.S. Cl.
CPC .............. G01M 17/08 (2013.01); G01M 17/10 (2013.01)

(58) Field of Classification Search
CPC .............................. G01M 1/00; G01M 17/024
USPC ......... 702/19, 34, 85, 179, 182, 183, 35, 105; 324/179; 701/19
See application file for complete search history.

(56) References Cited

U.S. PATENT DOCUMENTS

| 4,507,964 | A * | 4/1985 | Borner ................. G01M 1/225 73/462 |
| 4,602,335 | A * | 7/1986 | Perlmutter ..................... 701/20 |
| 6,701,228 | B2 * | 3/2004 | Kane et al. ..................... 701/19 |
| 7,201,350 | B2 * | 4/2007 | Sugita et al. ............. 246/122 R |
| 2003/0225490 | A1 * | 12/2003 | Kane et al. ..................... 701/19 |
| 2010/0023190 | A1 * | 1/2010 | Kumar et al. .................. 701/20 |

FOREIGN PATENT DOCUMENTS

| CN | 2284392 | 6/1998 |
| CN | 101410286 | 4/2009 |

(Continued)

OTHER PUBLICATIONS

Korean Intellectual Property Office Application Serial No. 10-2011-0137299, Office Action dated Mar. 5, 2013, 5 pages.

(Continued)

*Primary Examiner* — John Breene
*Assistant Examiner* — Felix Suarez
(74) *Attorney, Agent, or Firm* — Lee, Hong, Degerman, Kang & Waimey

(57) ABSTRACT

Provided is a measuring apparatus and method of train wheel wear, the apparatus including a speed measuring unit measuring speed of a train, a position measuring unit measuring a position of the train, and a calculation unit calculating abrasiveness of a train wheel on a train based on the measured speed and position of the train, whereby status of the train wheel can be accurately learned to minimize the number of devices that may be additionally installed, and to quickly measure abrasiveness of the train wheel as well.

5 Claims, 5 Drawing Sheets

(56) References Cited

FOREIGN PATENT DOCUMENTS

| CN | 202038323 | 11/2011 |
| JP | 2010-181216 | 8/2010 |
| KR | 10-2004-0055140 | 6/2004 |
| KR | 10-0866613 | 11/2008 |

OTHER PUBLICATIONS

The State Intellectual Property Office of the People's Republic of China Application Serial No. 201210555569.5, Office Action dated Feb. 13, 2015, 7 pages.

* cited by examiner

MEASURING APPARATUS AND MEASURING METHOD OF TRAIN WHEEL WEAR

CROSS-REFERENCE TO RELATED APPLICATIONS

Pursuant to 35 U.S.C. §119 (a), this application claims the benefit of earlier filing date and right of priority to Korean Patent Application No. 10-2011-0137299, filed on Dec. 19, 2011, the contents of which are hereby incorporated by reference herein in their entirety.

BACKGROUND OF THE DISCLOSURE

1. Field of the Disclosure

The present disclosure relates to a measuring apparatus and measuring method of train wheel wear, and more particularly to a measuring apparatus measuring a train wheel wear using a tachometer and a balise, and a measuring method using the measuring apparatus.

2. Discussion of the Related Art

The information disclosed in this Discussion of the Related Art section is only for enhancement of understanding of the general background of the present disclosure and should not be taken as an acknowledgement or any form of suggestion that this information forms the prior art already known to a person skilled in the art.

Train wheels need a periodic replacement due to continuous wear during operation of a train. Thus, a device or a method capable of measuring a periodic wear of a train is required.

In order to measure a train wheel wear in a CBTC (Communication Based Train Control)-based railway signal system, devices such as a camera and a photo sensor have been conventionally used to measure the train wheel wear.

FIG. 1 is a block diagram illustrating a configuration of a measuring apparatus of a train wheel wear. Referring to FIG. 1, a measuring apparatus (10) includes cameras (20-1, 20-2), Analogue to Digital Converters (ADCs, 30-1, 30-2), a CPU (Central Processing Unit, 40), a memory (50), a display interface (60), a display unit (70), an input/output interface (80) and a photo sensor (90).

The cameras (20-1, 20-2) function to photograph train wheels passing on a rail. A central position of a light receiving lens of the cameras (20-1, 20-2) photographing a distal end of a flange is aligned with a height of the distal end to allow facing between the distal end and a reference groove, where the camera photographs the train wheels at a contact region with the rail. A dimension of each part expected through the reference groove and a dimension of an image actually photographed are compared to calculate a size of the wheel. Meanwhile, the photo sensor (90) is disposed to reduce an error.

The image photographed by the cameras (20-1, 20-2) is converted to a digital signal by the ADCs (30-1, 30-2). The CPU (40) receives the digital signal to store the signal in the memory (50) or transmit the signal to the display interface (60). The display interface (60) displays the received signal to allow a user to intuitively learn abrasiveness of the wheel. Meanwhile, the apparatus may include input/output interface (80) enabling an input from an outside device (95).

Although the conventional apparatus has an advantage of performing a highly accurate measurement of wheel wears using the cameras, the conventional apparatus suffers from a disadvantage of requiring additional devices such as the cameras (20-1, 20-2) and the photo sensor (90) Furthermore, the cameras (20-1, 20-2) and the photo sensor (90) are too expensive for being disposed on all trains, and durability thereof is not that high.

Another disadvantage is that a mechanical characteristic may be changed due to formation of a reference groove on the train wheel for providing an accurate reference point for installation on the train wheel. Still another disadvantage is that it is difficult to measure the size of the train wheel during train operation, and that use is only possible during maintenance/repair processes for measuring the status of the train wheel.

Thus, there is a need to address the abovementioned disadvantages.

SUMMARY OF THE DISCLOSURE

This section provides a general summary of the disclosure, and is not a comprehensive disclosure of its full scope or all of its features.

Exemplary aspects of the present disclosure are to substantially solve at least the above problems and/or disadvantages and to provide at least the advantages below. Accordingly, an aspect of the present disclosure provides a measuring apparatus and measuring method of train wheel wear configured to accurately learn the status of a train wheel only using a balise receiver and a tachometer.

It should be emphasized, however, that the present disclosure is not limited to a particular disclosure, as explained above. It should be understood that other technical subjects not mentioned herein may be appreciated by those skilled in the art.

In one general aspect of the present disclosure, there is provided a measuring apparatus of train wheel wear, the apparatus comprising: a speed measuring unit measuring speed of a train; a position measuring unit measuring a position of the train; and a calculation unit calculating abrasiveness of a train wheel on the train based on the measured speed and position of the train.

In some exemplary embodiments, the apparatus may further comprise storage storing the abrasiveness of the train wheel calculated by the calculation unit.

In some exemplary embodiments, the apparatus may further comprise a display unit displaying the abrasiveness of the train wheel calculated by the calculation unit to a user.

In some exemplary embodiments, the calculation unit may calculate the abrasiveness of the train wheel by measuring a size of the train wheel based on the measured speed and position of the train.

In some exemplary embodiments, the calculation unit may calculate the size of the train wheel using the following Equation of $r = \frac{1}{2\pi} \ln_{axis}$ where, r is the size of a train wheel, 1 is a moving distance, and $n_{axis}$ is a revolution of the train wheel.

In some exemplary embodiments, the speed measuring unit may include a tachometer, and the tachometer may measure the revolution of the train wheel.

In some exemplary embodiments, the position measuring unit may include a balise receiver receiving a position signal from the balise.

In some exemplary embodiments, the balise receiver may receive the signal from the balise using a wireless communication.

In another general aspect of the present disclosure, there is provided a measuring method of train wheel wear, the method comprising: measuring a revolution of a train wheel and a speed of a train using a tachometer; measuring a position of the train by receiving a position signal from a balise; and measuring abrasiveness of the train wheel by calculating a size of the train wheel using the measured revolution of train wheel, and the speed and position of the train.

In some exemplary embodiments, the method further comprises storing the measured abrasiveness of the train wheel; and displaying the measured abrasiveness of the train wheel to a user.

The measuring apparatus and measuring method of train wheel wear according to the present disclosure has an advantageous effect in that status of a train wheel can be accurately learned to minimize the number of devices that are to be installed, and to quickly measure abrasiveness of the train wheel as well.

Other exemplary aspects, advantages, and salient features of the disclosure will become more apparent to persons of ordinary skill in the art from the following detailed description, which, taken in conjunction with the annexed drawings, discloses exemplary embodiments of the invention.

The above and other features of the invention are discussed infra.

BRIEF DESCRIPTION OF THE DRAWINGS

The above and other features of the present disclosure will now be described in detail with reference to certain exemplary embodiments thereof illustrated in the accompanying drawings which are given hereinafter by way of illustration only, and thus are not limitative of the present invention, and wherein.

Figure 1:
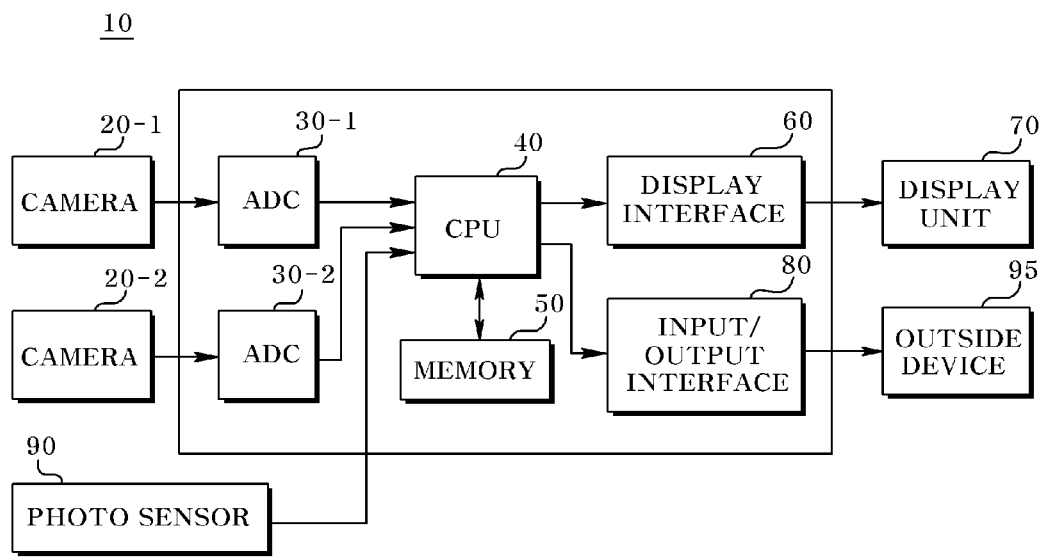
FIG. 1 is a block diagram illustrating a configuration of a measuring apparatus of train wheel wear according to prior art.

Additional advantages, objects, and features of the disclosure will be set forth in part in the description which follows and in part will become apparent to those having ordinary skill in the art upon examination of the following explanation or may be learned from practice of the disclosure. The objectives and other advantages of the disclosure may be realized and attained by the structure particularly pointed out in the written description and claims hereof as well as the appended drawings.

It is to be understood that both the foregoing general description and the following detailed description of the present disclosure are exemplary and explanatory and are intended to provide further explanation of the disclosure as claimed.

DETAILED DESCRIPTION

Hereinafter, exemplary embodiments of the present disclosure will be described in detail with reference to the accompanying drawings.

In describing the present disclosure, detailed descriptions of constructions or processes known in the art may be omitted to avoid obscuring appreciation of the invention by a person of ordinary skill in the art with unnecessary detail regarding such known constructions and functions. Accordingly, the meaning of specific terms or words used in the specification and claims should not be limited to the literal or commonly employed sense, but should be construed or may be different in accordance with the intention of a user or an operator and customary usages. Therefore, the definition of the specific terms or words should be based on the contents across the specification.

The suffixes 'module', 'unit' and 'part' may be used for elements in order to facilitate the disclosure. Significant meanings or roles may not be given to the suffixes themselves and it is understood that the 'module', 'unit' and 'part' may be used together or interchangeably. That is, the terms "-er", "-or", "part" and "module" described in the specification mean units for processing at least one function and operation and can be implemented by hardware components or software components, and combinations thereof.

As used herein, "exemplary" is merely meant to mean an example, rather than the best. It is also to be appreciated that features, layers and/or elements depicted herein are illustrated with particular dimensions and/or orientations relative to one another for purposes of simplicity and ease of understanding, and that the actual dimensions and/or orientations may differ substantially from that illustrated. That is, in the drawings, the size and relative sizes of layers, regions and/or other elements may be exaggerated or reduced for clarity. Like numbers refer to like elements throughout and explanations that duplicate one another will be omitted.

The terminology used herein is for the purpose of describing particular embodiments only and is not intended to be limiting of the general inventive concept. As used herein, the singular forms "a", "an" and "the" are intended to include the plural forms as well, unless the context clearly indicates otherwise.

Unless specifically stated otherwise, as apparent from the following discussions, it should be understood that throughout the specification discussions utilizing terms such as "processing", "computing", "calculating", "determining", or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

It will be understood that when an element is referred to as being "connected" or "coupled" to another element, it can be directly connected or coupled to the other elements or intervening elements may be present. In contrast, when an element is referred to as being "directly connected" or "directly coupled" to another element, there are no intervening elements present.

Figure 2:
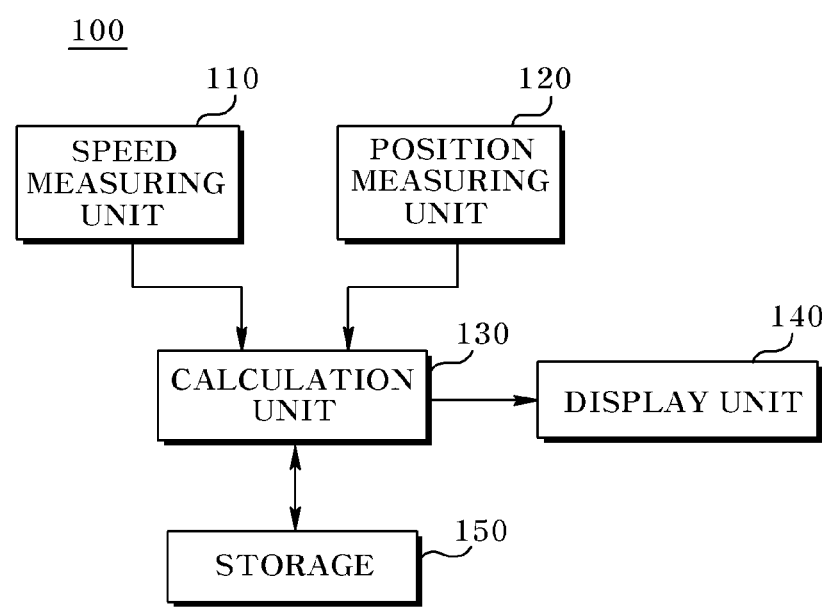
FIG. 2 is a block diagram illustrating a configuration of a measuring apparatus of train wheel wear according to an exemplary embodiment of the present disclosure.

FIG. 2 is a block diagram illustrating a configuration of a measuring apparatus (100) of train wheel wear according to an exemplary embodiment of the present disclosure.

Referring to FIG. 2, the measuring apparatus (100) of train wheel wear according to an exemplary embodiment of the present disclosure includes a speed measuring unit (110), a position measuring unit (120), a calculation unit (130), a display unit (140) and storage (150).

The speed measuring unit (110) functions to measure a speed of a running train. The speed measuring unit (110) may be formed by a tachometer. The tachometer, aks, a revolution counter, is an instrument measuring a rotational speed, where unit is revolution per minute and is displayed as rpm. A speed measurement of a train can be made possible by using the tachometer, and an accumulated number of revolutions can be also made possible by using the tachometer.

The position measuring unit (120) serves to measure a position of a running train. To be more specific, the position measuring unit (120) measures information on an absolute running distance of a running train.

The position measuring unit (120) includes a balise receiver receiving a position signal from a balise, where the balise means a device (facilities) capable of providing information on an absolute train position and installed at a railway side of a train. The balise receiver receives a signal on the absolute position information from the balise using a wireless communication, whereby the position measuring unit (120) can measure a position and a running distance of a train.

The calculation unit (130) calculates a train wheel size based on a speed measured by the speed measuring unit (110), revolution of a wheel and a current position or a running distance of a train measured by the position measuring unit (120). A wheel size may be calculated in terms of a diameter or a radius of the wheel.

Meanwhile, the calculated current wheel size may decrease in time due to wear in comparison with an initial wheel size, whereby abrasiveness (wear) of a wheel can be obtained. To be more specific, the calculation unit (130) may calculate the wheel size using the following Equation 1.

$$r = \frac{l}{2\pi n_{axis}}$$ [Equation 1]

where, r is the size of a train wheel, l is a moving distance, and $n_{axis}$ is a revolution of the train wheel.

The display unit (140) functions to show the wheel size or abrasiveness calculated by the calculation unit (130) to a user. The display unit (140) may be embodied by an LCD (Liquid Crystal Diode) or an LED (Light Emitting Diode).

Furthermore, in addition to a simple display to the user of the wheel size or abrasiveness using a number or a text, the display unit (140) enables a user to promptly cope with a situation by displaying the situation to the user where a reference abrasiveness stored in the storage (described later) is compared with the currently measured wheel abrasiveness, and the user is notified of a fact that the currently measured wheel abrasiveness is smaller than the reference abrasiveness, if the currently measured wheel abrasiveness is smaller than the reference abrasiveness.

The storage (150) functions to store the wheel size or the abrasiveness calculated by the calculation unit (130). To be more specific, the storage (150) may store the wheel size or the abrasiveness in terms of time, date and year. Furthermore, the storage (150) may store the reference abrasiveness for warning a user a fact that the calculated wheel size or wheel abrasiveness is smaller than the reference size or reference abrasiveness, if the wheel size or the currently measured wheel abrasiveness is smaller than the reference size or reference abrasiveness.

The user can learn an accurate status of the train wheel through the configuration thus described, to thereby minimize the number of devices to be installed and to quickly measure the abrasiveness of the wheel.

Figure 3:
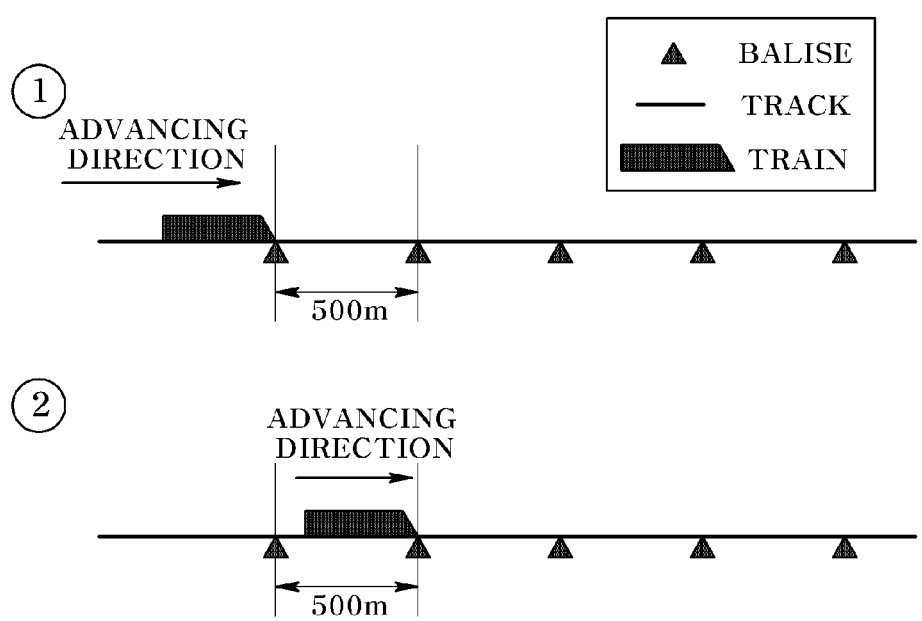
FIG. 3 is a schematic view illustrating an operation of a measuring apparatus of train wheel wear according to an exemplary embodiment of the present disclosure.

FIG. 3 is a schematic view illustrating an operation of a measuring apparatus of train wheel wear according to an exemplary embodiment of the present disclosure.

An upper figure shown as ① in FIG. 3 indicates that a train starts to run along a track, and a lower figure shown as ② in FIG. 3 shows that a train is positioned at where an immediate next balize is located, after running along a track. The balize in FIG. 3 is installed at every 500 m, and an installation terval is invariable.

The measuring apparatus (100) of train wheel wear according to an exemplary embodiment of the present disclosure measures the abrasiveness by calculation of wheel size, the method of which will be described later.

Although it seems that a wheel size may be understandably unchanged if an accumulated distance is same as a balise distance, for a case the accumulated distance having been calculated based on the measured wheel size, but for a case of the accumulated distance being smaller than the balise distance, it means that the wheel is worn and the wheel size used for measurement of accumulated distance is smaller. Furthermore, if the accumulated distance is greater than the balise distance, it means that the wheel size used for measurement has been changed. Information on the numerical calculation of the wheel using the above method can be learned by a monitoring room, making it easy to repair and maintain the train wheels.

Figure 4:
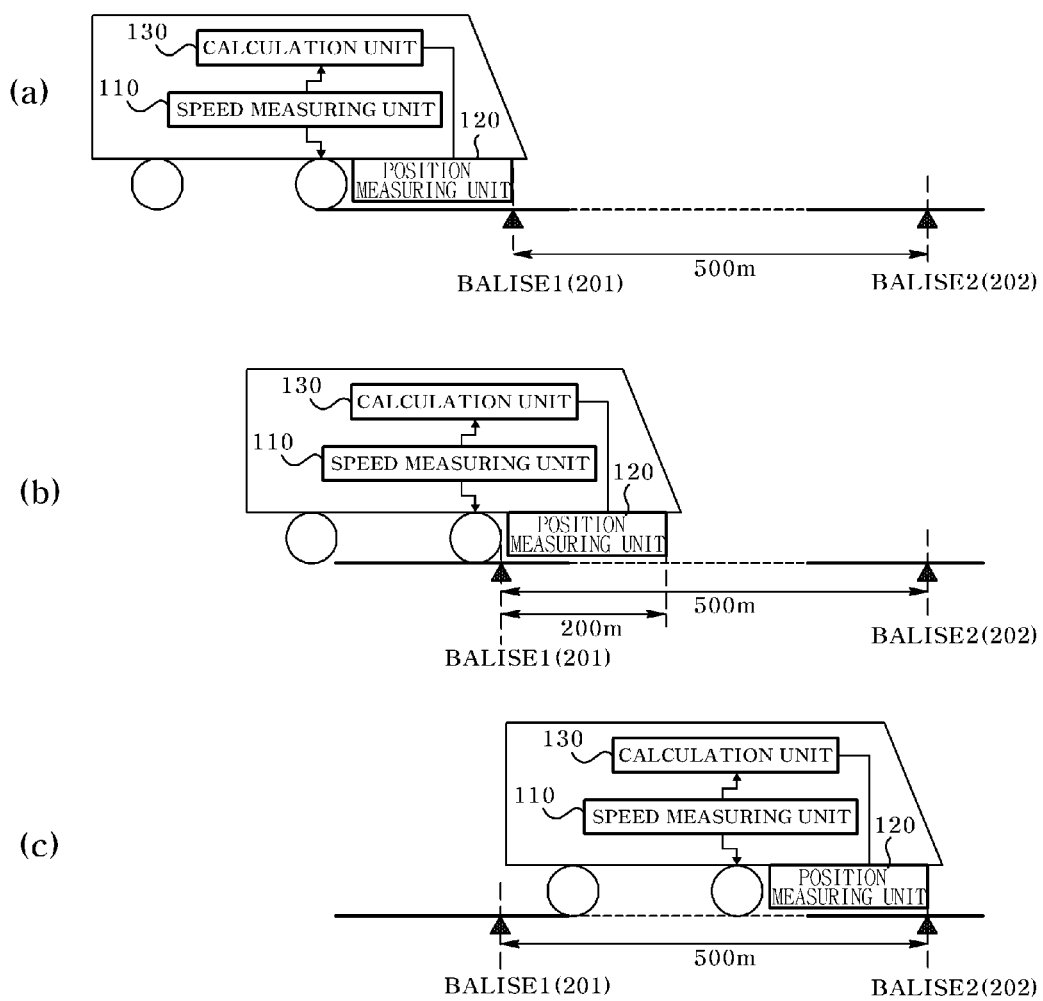
FIG. 4 is a schematic view illustrating in detail a process of detecting a size of a train wheel in a measuring apparatus of train wheel wear according to an exemplary embodiment of the present disclosure.

FIG. 4 is a schematic view illustrating in detail a process of detecting a size of a train wheel in a measuring apparatus of train wheel wear according to an exemplary embodiment of the present disclosure.

Referring to FIG. 4(a), the apparatus (100) for measuring the train wheel wear at a train start point {the train start point is when the train reaches a first balise (210)} uses the speed measuring unit (110) to measure the train speed. Meanwhile, the position measuring unit (120) at the first balise (201) receives an absolute train position transmitted through a wireless communication with the first balise (201). The position measuring unit (120) includes a balise receiver receiving a signal transmitted from the balise. Information measured by the speed measuring unit (110) and the position measuring unit (120) is transmitted to the calculation unit (130).

In a case the train in FIG. 4(b) passes the first balise (201) to move to the same direction, and reaches a second balise (202), the position measuring unit (120) receives a position signal from the second balise (202). FIG. 4(c) illustrates that the train has reached the second balise (202). The speed measuring unit (110) and the position measuring unit (120) continuously measure the speed information and the position information and transmit the information to the calculation unit (130). The calculation unit (130) calculates the wheel size using the above Equation 1 to measure the wheel abrasiveness or wear.

To be more specific, the speed measuring unit (110) in FIG. 4(a) initializes a pulse count stored in the tachometer to zero (0) the moment the speed measuring unit (110) meets the first balise (201), and increases the tachometer pulse until meeting the second balise (202).

In a case the train moves, the tachometer pulse count increases to accumulate the distance moved through the tachometer. The wheel revolves 74 times (rounds or wheels) for a new wheel, in a case the train speeds at 200 meter per minute as shown in FIG. 4(a), and a wheel that has reached a use limit may rotate 82 wheels.

At this time, the wheel size for a new wheel may be 860 mm, while that for a use limit is 774 mm.

In a case the train keeps moving to reach the second balise (202), the apparatus (100) may compare the distance moved through the tachometer with an accurate distance (i.e., 500 m) learned through the first and second balises (210, 202) to calculate an inputted wheel size. The wheel size may be obtained by using the Equation 1. Meanwhile, the $n_{axis}$ may be obtained by tachometer output pulse/pulse per wheel on the tachometer. Particularly, the apparatus is preferably used at a section where gradient is small and passengers are not loaded, because it is important to operate the apparatus at a section where there is generated no slip.

Figure 5:
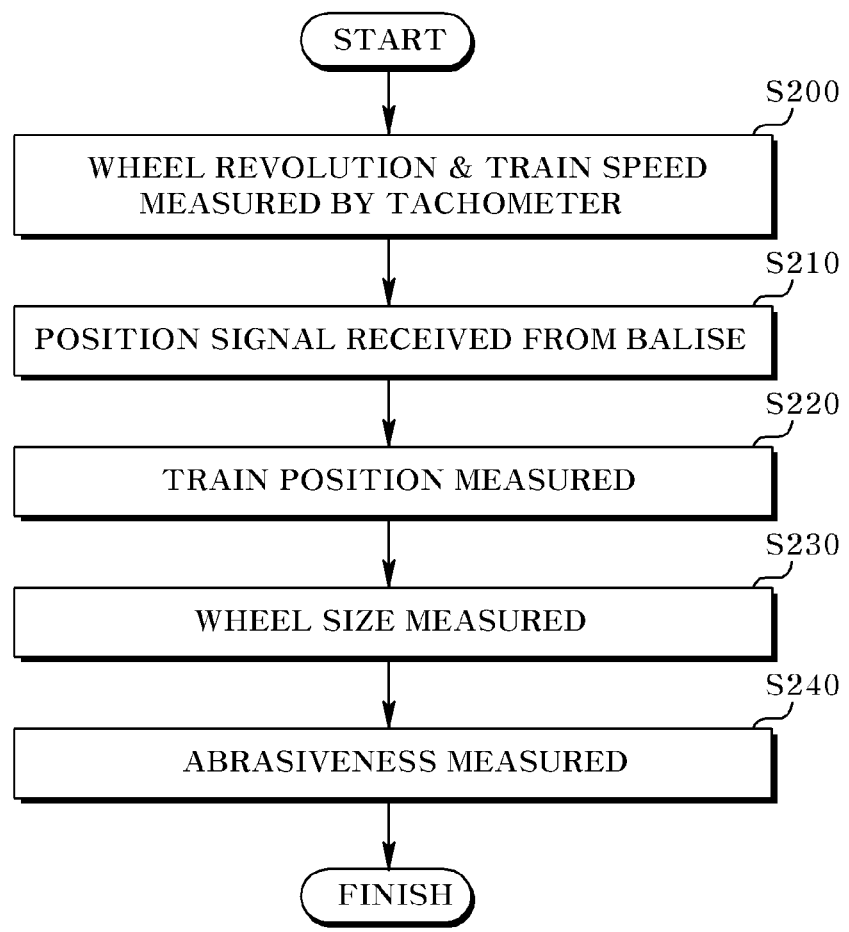
FIG. 5 is a schematic view illustrating a measuring method of a train wheel wear according to an exemplary embodiment of the present disclosure.

FIG. 5 is a schematic view illustrating a measuring method of a train wheel wear according to an exemplary embodiment of the present disclosure.

First, a tachometer is used to measure revolution and speed of a train (S200), which is performed by the speed measuring unit (110). Furthermore, a position signal is received from a balise (S210) to measure a position of the train (S220), where a moved distance of the train can be calculated using the position of the train, which is performed by the position measuring unit (120).

Once the revolution, speed and moved distance of the train are calculated, the Equation 1 is used to calculate a wheel size (S230). Thereafter, the wheel size is used to measure the abrasiveness (wear) (S240). At this time, regarding the measurement of the abrasiveness, an original wheel size is given as 100%, and the abrasiveness can be defined by gradual decrease of the wheel size.

Although not illustrated in FIG. 5, the method may further comprise steps of storing the measured wheel abrasiveness and of displaying the measured wheel abrasiveness to a user.

The measuring method of a train wheel wear according to an exemplary embodiment of the present disclosure advantageously enables wheel repairs through automatic performance of data for maintenance and repair of the train before destruction of wheels at a base section free from interference of a repairman. Furthermore, information generated during operation of a train can be accumulated by comparing a wheel size measured at a start point with that measured at the time of arrival, which can be also used as a base data for verification when a problem occurs.

The above-mentioned measuring apparatus and measuring method of train wheel wear according to the present disclosure may, however, be embodied in many different forms and should not be construed as limited to the embodiments set forth herein. Thus, it is intended that embodiments of the present disclosure may cover the modifications and variations of this disclosure provided they come within the scope of the appended claims and their equivalents.

While particular features or aspects may have been disclosed with respect to several embodiments, such features or aspects may be selectively combined with one or more other features and/or aspects of other embodiments as may be desired.

The present disclosure has an industrial applicability in that addition of new devices can be minimized in a CBTC-based train system, dispensing with changes in cameras or wheels unlike the conventional system, whereby moneywise and timewise burdens caused by addition of new devices can be saved.

What is claimed is:

1. A measuring apparatus of train wheel wear, the apparatus comprising:
   a speed measuring unit configured to measure a revolution of a train wheel and a speed of a train using a tachometer;
   a position measuring unit configured to measure a position of the train by receiving a position signal from a balise, wherein the position of the train is information on an absolute running distance of a running train;
   a calculation unit configured to calculate abrasiveness of the train wheel by calculating a size of the train wheel using the measured revolution of the train wheel, and the speed and the position of the train;
   a storage configured to store the calculated abrasiveness of the train wheel calculated by the calculation unit; and
   a display unit configured to display the calculated abrasiveness of the train wheel calculated by the calculation unit,
   wherein the storage stores a reference abrasiveness for warning a user that the calculated wheel size or the calculated abrasiveness of the train wheel is smaller than a reference size or is smaller than a reference abrasiveness, if the calculated wheel size or the calculated abrasiveness of the train wheel is smaller than the reference size or the reference abrasiveness, and
   wherein the display unit displays that the abrasiveness of the train wheel is smaller than the reference abrasiveness, if the calculated abrasiveness of the train wheel is smaller than the reference abrasiveness.

2. The apparatus of claim 1, wherein the calculation unit calculates the size of the train wheel using the following Equation of $$r = \frac{l}{2\pi n_{axis}}$$

where, r is the size of the train wheel, l is a moving distance, and $n_{axis}$ is the measured revolution of the train wheel.

3. The apparatus of claim 1, wherein the position measuring unit comprises a balise receiver configured to receive the position signal from the balise.

4. The apparatus of claim 3, wherein the balise receiver receives the position signal from the balise using a wireless communication.

5. A measuring method of train wheel wear, the method comprising:
   measuring a revolution of a train wheel and a speed of a train using a tachometer;
   measuring a position of the train by receiving a position signal from a balise, wherein the position of the train is information on an absolute running distance of a running train;
   measuring abrasiveness of the train wheel by calculating a size of the train wheel using the measured revolution of train wheel, and the speed and the position of the train;
   storing the measured abrasiveness of the train wheel; and
   displaying the measured abrasiveness of the train wheel to a user,
   wherein the storing includes storing a reference abrasiveness for warning a user that the calculated wheel size or the abrasiveness of the train wheel is smaller than a reference size or a reference abrasiveness, if the calculated wheel size or the abrasiveness of the train wheel is smaller than the reference size or the reference abrasiveness,
   wherein the displaying includes displaying that the abrasiveness of the train wheel is smaller than the reference abrasiveness, if the abrasiveness of the wheel is smaller than the reference abrasiveness.

* * * * *